United States Patent
Hansen et al.

(10) Patent No.: US 12,473,157 B2
(45) Date of Patent: Nov. 18, 2025

(54) LOGISTICS ARRANGEMENT FOR AUTOMATIC LOADING AND UNLOADING OPERATIONS

(71) Applicant: ROEQ APS, Vissenbjerg (DK)

(72) Inventors: Michael Hansen, Morud (DK); Carsten Sørensen, Herlev (DK)

(73) Assignee: Roeq ApS, Vissenbjerg (DK)

( * ) Notice: Subject to any disclaimer, the term of this patent is extended or adjusted under 35 U.S.C. 154(b) by 479 days.

(21) Appl. No.: 17/795,519

(22) PCT Filed: Sep. 28, 2020

(86) PCT No.: PCT/EP2020/077138
§ 371 (c)(1),
(2) Date: Jul. 26, 2022

(87) PCT Pub. No.: WO2021/151529
PCT Pub. Date: Aug. 5, 2021

(65) Prior Publication Data
US 2023/0056402 A1   Feb. 23, 2023

(30) Foreign Application Priority Data
Jan. 27, 2020   (DK) ............................ PA 2020 00102

(51) Int. Cl.
*B65G 65/02* (2006.01)
*B65G 47/52* (2006.01)
*B65G 47/88* (2006.01)
*B65G 65/00* (2006.01)

(52) U.S. Cl.
CPC ............ *B65G 65/02* (2013.01); *B65G 47/52* (2013.01); *B65G 47/8815* (2013.01); *B65G 65/005* (2013.01)

(58) Field of Classification Search
None
See application file for complete search history.

(56) References Cited

U.S. PATENT DOCUMENTS

| | | | |
|---|---|---|---|
| 9,932,019 B2 * | 4/2018 | Hassounah | B60L 53/80 |
| 10,011,439 B2 * | 7/2018 | Sonoura | B65G 61/00 |
| 10,131,389 B1 * | 11/2018 | Mahr | B62D 65/10 |
| 11,034,533 B2 * | 6/2021 | Kara | B65G 1/1378 |
| 11,840,412 B2 * | 12/2023 | Dederichs | B65G 1/08 |

(Continued)

FOREIGN PATENT DOCUMENTS

| | | | |
|---|---|---|---|
| EP | 3 452 392 | | 3/2019 |
| EP | 3 670 402 | | 6/2020 |
| WO | WO2020/126391 | * | 6/2020 |

OTHER PUBLICATIONS

International Search Report for PCT/EP2020/077138 dated Nov. 6, 2020, 3 pages.

(Continued)

*Primary Examiner* — Mark C Hageman
(74) *Attorney, Agent, or Firm* — Nixon & Vanderhye P.C.

(57) ABSTRACT

A logistics arrangement for conveying objects between different locations is provided herein. The logistics arrangement comprises a loading structure having a first storage area, a mobile robot having a second storage area, and a guard module arranged at the loading structure. The guard module is configured to be operated in a closed mode and an open mode.

16 Claims, 10 Drawing Sheets

(56) References Cited

U.S. PATENT DOCUMENTS

| | | | |
|---|---|---|---|
| 2004/0104101 A1* | 6/2004 | Brixius | B65G 47/643 198/575 |
| 2012/0048678 A1* | 3/2012 | Itoh | B65G 13/075 198/577 |
| 2015/0039157 A1 | 2/2015 | Wolfe et al. | |
| 2017/0308096 A1 | 10/2017 | Nusser et al. | |
| 2019/0188632 A1 | 6/2019 | Galluzzo et al. | |

OTHER PUBLICATIONS

Written Opinion of the ISA for PCT/EP2020/077138 dated Nov. 6, 2020, 6 pages.

\* cited by examiner

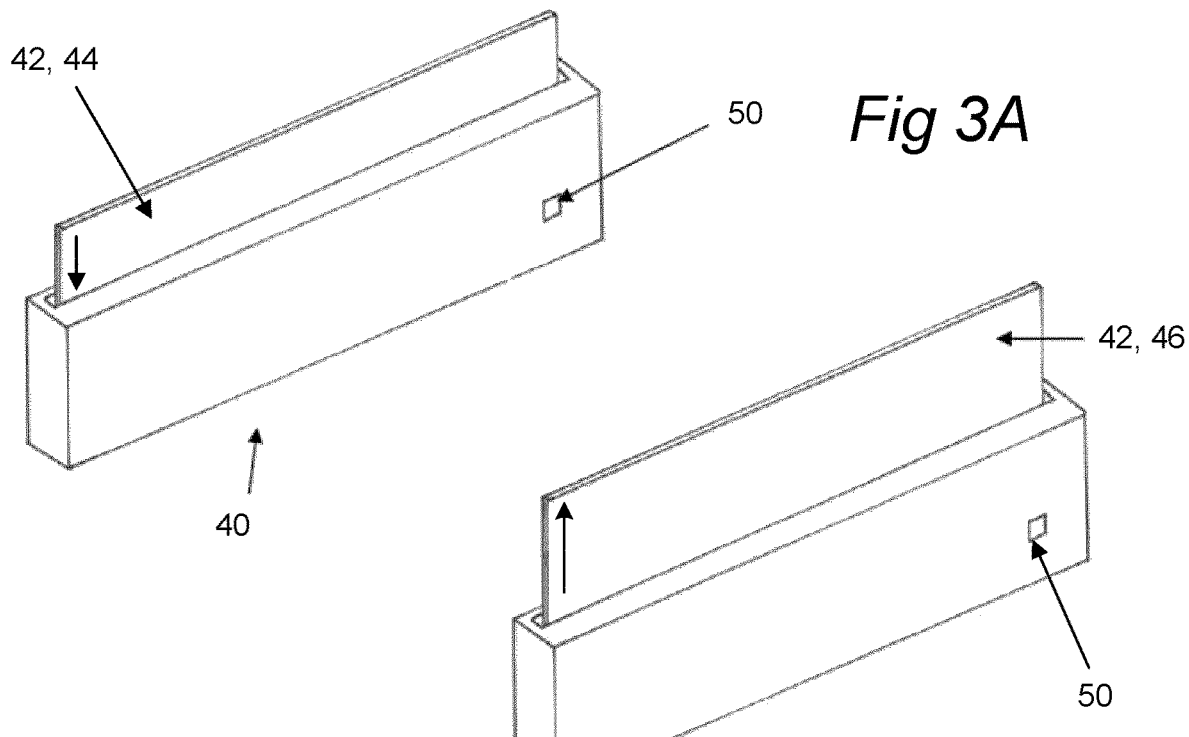
*Fig 3A*
*Fig 3B*
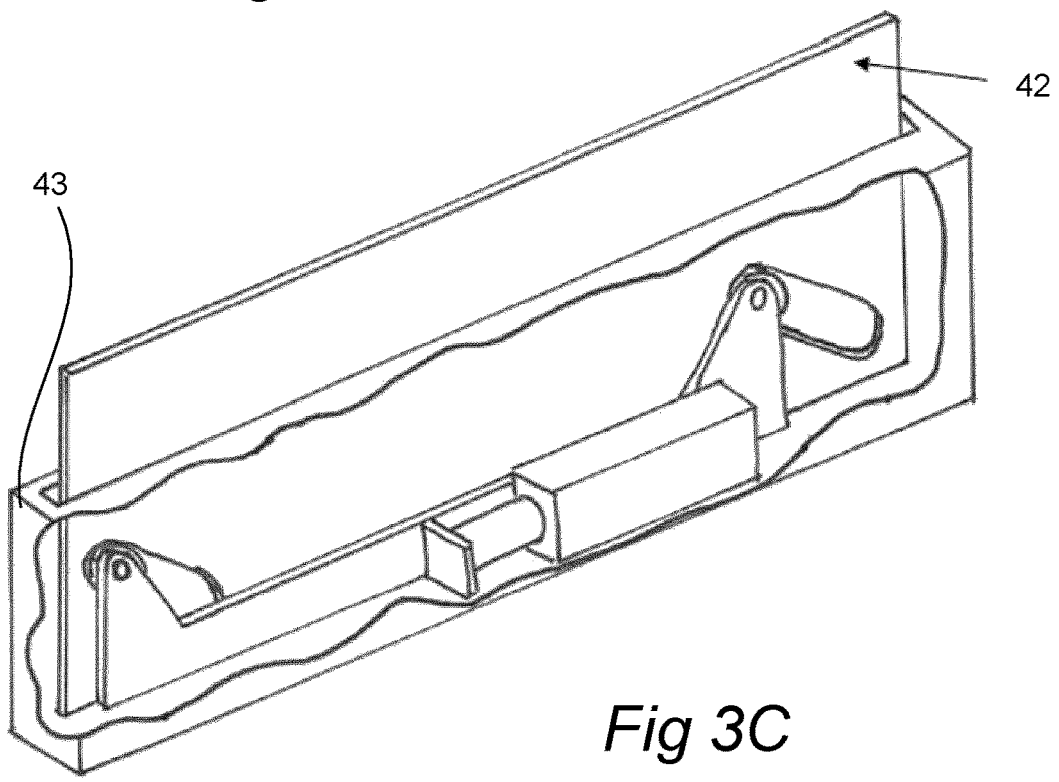
*Fig 3C*

LOGISTICS ARRANGEMENT FOR AUTOMATIC LOADING AND UNLOADING OPERATIONS

This application is the U.S. national phase of International Application No. PCT/EP2020/077138 filed Sep. 28, 2020 which designated the U.S. and claims priority to DK PA 2020 00102 filed Jan. 27, 2020, the entire contents of each of which are hereby incorporated by reference.

TECHNOLOGY FIELD

The present invention relates to a guard module and a method for use with mobile robots. The invention also relates to a logistics arrangement for loading and unloading objects between mobile robots and loading structures.

BACKGROUND

Mobile robots are automated guided vehicles being programmed to operate in both indoor and outdoor logistics environments. These robots are widely used to transport various objects, goods or articles in private and public locations.

The mobile robots are often entities in a much larger logistics arrangement. Particularly in industrial environments, there is a need to load objects from specific locations and to communicate with other vehicles, structures or systems for precise unloading of the loaded object to another location. To be able to cope with high speed and accurate loading, conveying and unloading of goods, it is of paramount importance that the correct object is loaded and unloaded at the correct time and positions, and that the conveying is as smooth and efficient as possible. Furthermore, safe operation is required so that no people are injured or that no objects are damaged. A delayed or lost conveying of an object can potentially be extremely costly.

Although most mobile robots have some means for communicating with other entities, servers or the like, there is a need to provide the correct communication needed in order to safely load and unload objects to and from a mobile robot. Many logistics arrangements of today cannot guarantee such robust operation, especially if the objects are heavy and/or ungainly. Additionally, there are currently no improvements to existing mobile robot solutions that can fulfill the above described provisions, while simultaneously being universally compatible. In particular, there is a need to provide additional safety measures for ensuring a fast and safe loading and unloading of objects between mobile robots and fixed loading structures.

In light of the observations above, the present inventors have identified problems and shortcomings in this regard. Accordingly, an object of the present invention is to overcome, or at least mitigate one or more of these problems.

SUMMARY

An object of the present disclosure is to provide a logistics arrangement, a guard module, a mobile robot, a system and a method which seeks to mitigate, alleviate, or eliminate one or more of the above-identified deficiencies in the art and disadvantages singly or in any combination.

In a first aspect, a logistics arrangement for conveying objects between different locations is provided. The logistics arrangement comprises a loading structure having a first storage area, a mobile robot having a second storage area, and a guard module arranged at the loading structure. The guard module is configured to be operated in a closed mode and an open mode.

Technical provisions provided by the logistics arrangement are multiple. The technical solution provides a simple solution to a complex logistics problem. Loading, unloading and conveying goods between different locations typically require a plurality of components or entities to be compatible in an arrangement. The guard module advantageously enables this by being easy to install, reliable, universally compatible, relatively cheap, and works in any logistics environment having mobile robots and loading structures. Benefits of the present invention also come from requiring less physical space, since a specifically customized receiving station is not needed as the mobile robots can deliver objects to any station having the easy-to-install guard module arranged thereon. With that being said, a large number of loading structures can be arranged with a guard module and used within the logistics arrangement. As a consequence, the logistics arrangement can assure a high uptime related to speed and security, with low failure rates related to machine failures and compatibility issues.

According to one embodiment, in the closed mode, one or more objects are prevented from passing the guard module, and in the open mode, one or more objects are allowed to pass the guard module. The guard module may further comprise a physical barrier adapted to be movable between an extended position corresponding to the closed mode of the guard module and a retracted position corresponding to the open mode of the guard module.

According to one embodiment, the logistics arrangement further comprises a control unit configured to operate the guard module in the closed mode and the open mode. The control unit may be arranged at the loading structure, at the mobile robot, or at the guard module.

According to one embodiment, the guard module is operatively connected to proximity detection means configured to detect the mobile robot as being within a predetermined distance from the guard module, and in response thereto configuring the guard module to operate in the open mode.

According to one embodiment, the guard module is operatively connected to conveying detection means configured to detect that one or more objects have been successfully conveyed between the first and second storage areas, and in response thereto configuring the guard module to operate in the closed mode.

According to one embodiment, the proximity detection means and/or the conveying detection means comprise(s) optical sensors, ultrasonic sensors, inductive sensors, magnetic sensors, photoelectric sensors, capacitive sensors, pneumatic sensors, weight or pressure sensors, motion sensors, cameras, electromechanical switches or any combination thereof.

According to one embodiment, the mobile robot is configured to communicate its presence as being within a predetermined distance from the guard module by establishing direct communication with the guard module, and transmitting a control signal to the guard module, via the established direct communication, to configure the guard module to operate in an open mode. The mobile robot may further be configured to transmit a control signal, via the established direct communication, that one or more objects have been successfully conveyed between the first and second storage areas, thereby controlling the guard module to operate in the closed mode.

According to one embodiment, direct communication between the guard module and the mobile robot is established as any of the following communication techniques: a proximity-based radio communication signal, a beacon protocol, NFC, (ultra)sound communication, and infrared data communication. Direct communication between the guard module and the mobile robot assures a safe and fast data transfer, as no other devices need to be involved in the conveying procedure. By having individual direct communication between every mobile robot and guard module in the logistics arrangement, latencies and thus delays can be greatly minimized, since no larger system is required to control and/or route all the signals present in the logistics arrangement.

According to one embodiment, the first and/or second storage areas of the logistics arrangement comprises conveying means having brakes. In the closed mode, the guard module and/or the mobile robot may be configured to transmit a control signal for activating the brakes of the conveying means. In the open mode, the guard module and/or the mobile robot may be configured to transmit a control signal for deactivating the brakes of the conveying means.

According to one embodiment, the guard module is arranged on at least one transport end of the loading structure.

According to one embodiment, the loading structure is a fixed structure or another mobile robot.

In a second aspect, a guard module configured to be arranged at a loading structure in a logistics arrangement is provided. The guard module is configured to be operated in a closed mode and an open mode.

In a third aspect, a mobile robot comprising a storage area for conveying objects between different locations is provided. The mobile robot is configured to be detected by a guard module as being within a predetermined distance from a guard module.

According to one embodiment, the mobile robot comprises a top module, the top module comprising a storage area and a mobile robot controller. The mobile robot controller may be configured to communicate its presence as being within a predetermined distance from the guard module by establishing direct communication with a the guard module.

In a fourth aspect, a system comprising a guard module and a mobile robot is provided.

In a fifth aspect, a method of conveying objects between different locations is provided. The method involves providing a loading structure having a first storage area, providing a mobile robot having a second storage area, and arranging a guard module at the loading structure, wherein the guard module is configured to be operated in a closed mode and an open mode.

According to a further aspect, a security and communication module for handling package or item exchange between a mobile device and a fixed installation is provided. A security and communication module (interface module) for the secure transfer of packages or goods to and from a mobile device (here called the robot) or equipment mounted thereon is provided. Mobile robots are already widely used for logistics tasks in industry. The focus here is on creating an interface module that ensures safe and fast exchange of packages or goods to be exchanged between the fixed installation in production or in the warehouse and a mobile robot.

In one embodiment, the interface module is designed so that it can be attached to or next to the fixed installation where packages or goods are inserted into or leaving the fixed installation. The interface module may be mounted on fixed installations that are already in a given production. The interface module may also be built into new fixed installations to create a secure interface for external units that must deliver or pick up packages or goods from the permanent installation. The flow when retrieving bridge packages or goods may be as follows:

1) Robot arrives at fixed installation to collect or deliver a package or item.
2) The robot is ready to deliver or receive a package or item and provides information to the interface module that the robot is ready for transfer.
3) The interface module deactivates locks and packages or items can pass between the mobile robot and the fixed installation.
4) The interface module allows the fixed installation to receive a signal that packages or goods can now be transferred.
5) Package or item is transferred.
6) The robot gives a signal to the interface module when the package is completely received or sent.
7) The interface module activates locks and the robot can leave the pick-up or drop-off location.

Of the significant advantages of the mentioned setup, it can be mentioned that the transfer is secure and that the delay due to communication through external systems is minimized as much as possible. The communication between the interface module and the robot may be of the following types:

a. Data connection (WIFI, Bluetooth, etc.).
b. Data-free connection (IR, sound, etc.).
c. Contact-based (activation of switch, spring-loaded pins, etc.).

In one embodiment, the time to exchange information regarding whether the robot is ready to deliver or receive packages or goods is linked to when the robot is at the exchange point, i.e. "Ready" may be reported as soon as the robot arrives at the exchange point and "Not ready" may be reported when leaving the exchange point.

In one embodiment, clear notification may be handled by having presence at the exchange point as a prerequisite, while the actual ready message is given when from another system (internally in the robot or from an external source). "OK" may be given for a ready message (for example, you could have a requirement that a parent system must approve ready message, for example a system for controlling or handling several robots).

In one embodiment, an additional safety device is inserted so that the lock (e.g. plate) that blocks packages or goods does not stand in an intermediate position and thereby allows packages or goods to pass when it is not intended. The device may be intended to be inserted so that a switch is activated when the lock is "completely" deactivated (i.e. packages or goods can pass), while the same or a different switch is activated when the lock is "fully" activated.

In one embodiment, an interface module which ensures secure transfer of packages or goods between a fixed installation and a mobile device is characterized in that the interface module has a physical locking device which is only open when a mobile device is ready to deliver or receive a package or item.

In one embodiment, the interface module is equipped with an interaction system, characterized in that the mobile robot can interact directly with the interface module when delivering or picking up packages or goods.

In one embodiment, the interface module equipped with an interaction system is characterized by the fact that the interface module can interact directly with the control for external permanently installed devices.

In one embodiment, the locking device may be designed as a plate part which is slid up so that packages or goods can only leave or be received by the fixed installation when a signal is given from the mobile robot or equipment mounted thereon.

In one embodiment, the interface module for secure and fast transfer of packages or goods is provided between a fixed installation and a mobile device. The aspect relates to an interface module, which may act as a physical safety stop on a fixed installation, where a mobile device only stays for a short time at a time. The interface module ensures that only when the mobile device is in the correct "pick up" position does the "lock" open, so that packages or goods can only pass the interface module when a mobile robot is in the correct position for transferring packages or goods.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale; emphasis instead being placed upon illustrating the example embodiments.

FIGS. 3A-C are schematic illustrations of a guard module of a logistics arrangement according to an embodiment.

DETAILED DESCRIPTION OF THE EMBODIMENTS

Figure 1:
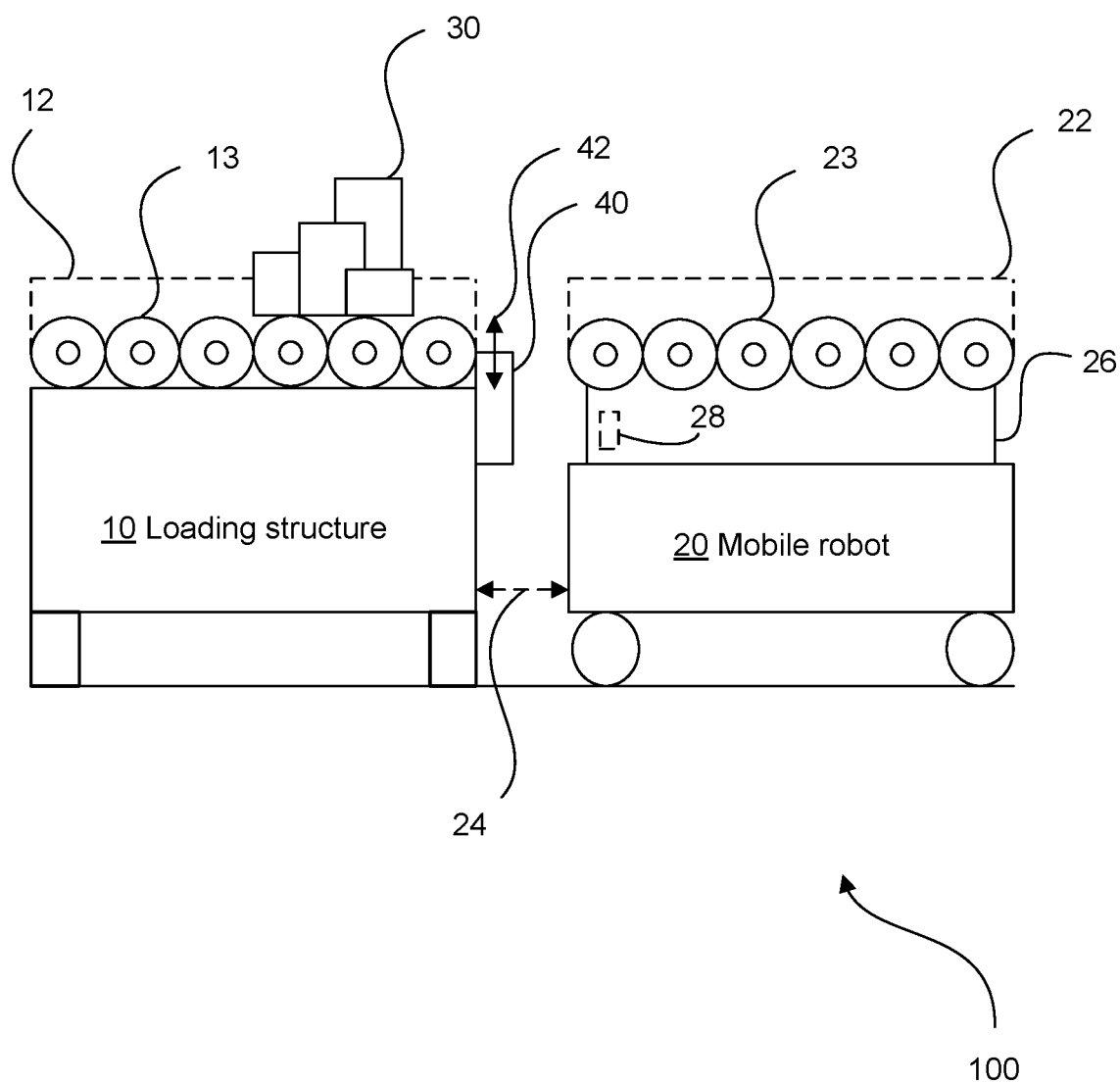
FIG. 1 is a schematic illustration of a logistics arrangement according to an embodiment.

The following description is directed to a logistics arrangement and components thereof which are used to load, convey and unload objects between different locations, and to communicate with vehicles, structures or systems related to the logistics arrangement.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

With reference to FIG. 1, one embodiment is shown of a logistics arrangement 100. The logistics arrangement 100 can, for instance, be related to an indoor or outdoor facility wherein loading, conveying and unloading of objects occur. Such facilities are typically related to industrial production, warehousing and stocktaking, but may also include a wide variety of facilities across multiple industries. A logistics arrangement 100 such as the one illustrated in FIG. 1 may vary in size and extent, both regarding physical dimensions and the number of parts belonging to the arrangement 100. Additionally or alternatively, a logistics arrangement 100 being responsible for one task can in some embodiments be operating in conjunction with one or more second logistics arrangements being responsible for another task for achieving a common goal. As an example, one logistics arrangement may be arranged to load objects in one facility and deliver these objects to a second logistics arrangement being installed in a second facility. The two logistics arrangements can also form part of one common logistics arrangement operating in both facilities.

In FIG. 1, the logistics arrangement 100 comprises a loading structure 10 having a first storage area 12. The loading structure 10 is in a preferred embodiment a fixed structure in relation to the floor or ground level. For instance, the loading structure 10 may be one or more shelves, racks, counters, inventories or stocks capable of storing, maintaining or housing objects of varying dimensions and weights. In an alternative embodiment, the loading structure 10 is a movable structure such as a mobile robot, vehicle, cart, truck, wagon, dolly that can be repositioned, relocated or transported to various locations by means of wheels, rollers, drums, casters, etc.

The first storage area 12 of the loading structure 10 is adapted to accommodate one or more objects 30 being stored thereon. The storage area 12 may be substantially parallel with the ground level and may be located vertically on top of the loading structure 10. In other embodiments, the loading structure 10 may contain a plurality of storage areas capable of storing objects in multiple parallel compartments of the loading structure 10.

The surface of the storage area 12 preferably comprises means for conveying objects 30 being stored thereon. For instance, conveying means 13 may comprise one or more rollers, wheels or conveyor belts that are configured to rotate. In one embodiment, the conveying means 13 are driven by an electric motor. Alternatively, the conveying means 13 are driven by the force produced from the objects 30 being stored thereon. Such a configuration may be advantageous shall the storage area 12 be slightly tilted in one direction, where gravity is affecting objects 30 to cause the conveying means 13 to rotate along their axes. In either configuration of the above, the conveying means 13 may comprise brakes being electrically or mechanically driven for preventing objects 30 to be conveyed on the storage area 12.

FIG. 1 further illustrates a mobile robot 20. In the shown embodiment, the logistics arrangement 100 comprises one mobile robot 20. The logistics arrangement 100 is however not restricted to only having one mobile robot 20. The mobile robot 20 may be an automated guided vehicle configured to automatically move along the ground or floor in logistics facilities. The mobile robot 20 is typically designed to perform transportation tasks such as transporting an object from one location to another. Depending on the object to be transported, the mobile robot 20 may be arranged in various configurations. In one embodiment, the mobile robot 20 therefore comprises a top module 26 being arranged on the mobile robot 20 in order to provide the mobile robot 20 with different associated equipment. The top module 26 is provided as a separate part, i.e. it is pre-manufactured and later mounted/connected to the mobile robot 20. It should be mentioned that the top module 26 could in some embodiments instead be integrated with the mobile robot 20, i.e. the top module 26 forms part of the mobile robot 20.

The top module 26 comprises a second storage area 22 which is adapted to accommodate one or more objects 30 being stored thereon. The objects 30 can be loaded onto the second storage area 22 of the mobile robot 20 from the first storage area 12 of the loading structure 10, or be unloaded in the opposite direction. In one embodiment, the second storage area 22 is configured with conveying means 23 similarly to the first storage area 12 for ensuring a compatible conveying of objects 30 between the two areas 12, 22. The second storage area 22 may also be configured differently, using any of the alternatives described for the conveying means 13 of the first storage area 12.

As can be seen in FIG. 1, the logistics arrangement 100 further comprises a guard module 40. The guard module 40 is preferably arranged as a simple plug-in solution on at least one side of the loading structure 10 using some fastening means such as screws, bolts, knobs, or any adhesive material. Alternatively, the guard module 40 is arranged as a separate entity between the loading structure 10 and the mobile robot 20, extending from a wall, the floor, ground or from any external structure. Yet alternatively, the guard module 40 can be arranged at the mobile robot 20.

In one embodiment, the logistics arrangement 100 comprises a control unit 50. The control unit 50 may be implemented using instructions that enable hardware functionality, for example, by using computer program instructions executable in a general-purpose or special-purpose processor that may be stored on a computer-readable storage medium (disk, memory, etc.) to be executed by such a processor. The control unit 50 is preferably configured to read instructions from a memory and execute these instructions to control the operation of the guard module 40. The memory of the control unit 50 may be implemented in any known memory technology, including but not limited to ROM, RAM, SRAM, DRAM, CMOS, FLASH, DDR, SDRAM or some other memory technology. In some embodiments, the memory may be integrated with or be internal to the control unit 50. The memory may store program instruction for execution by the control unit 50, as well as temporary and permanent data used by the control unit 50.

In different embodiments of the invention, the control unit 50 may be arranged at the loading structure 10, at the mobile robot 20, or at the guard module 40. The control unit 50 may also be a central system in any PLC (Port Logistics Chain), or arranged in an appropriate location in the logistics arrangement 100.

Figure 7A:
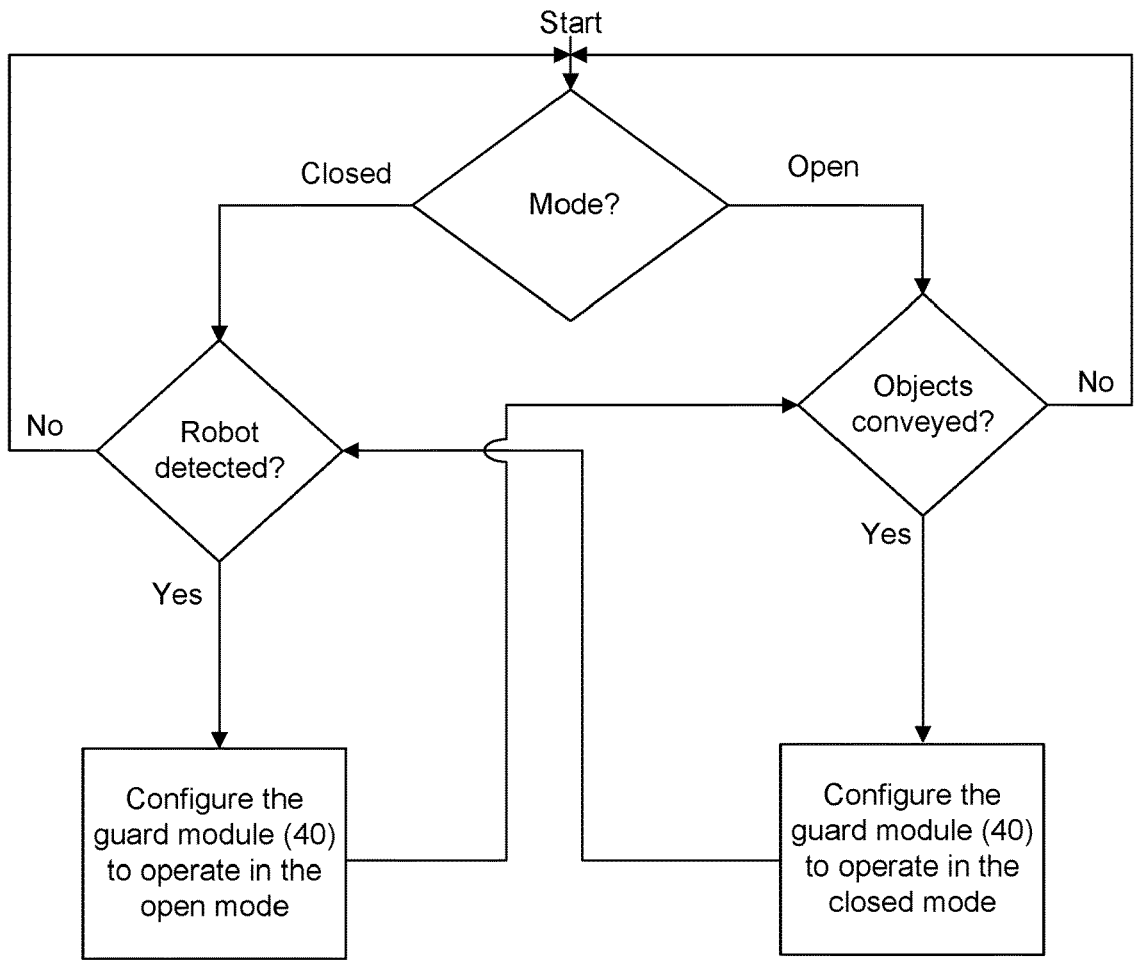
FIG. 7A is a schematic block diagram showing the logics of a guard module, according to an embodiment.
Figure 7B:
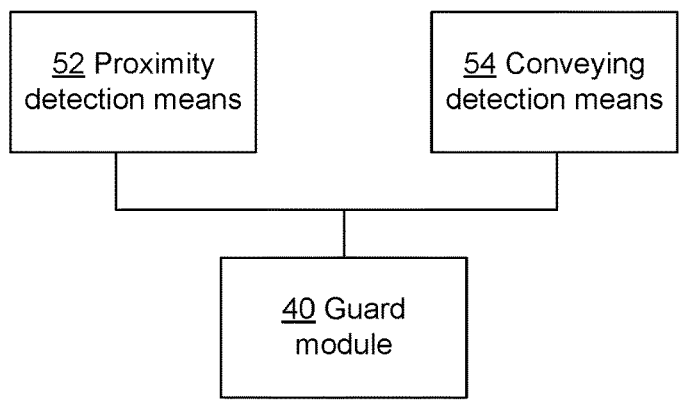
FIG. 7B is a schematic block diagram showing the guard module with associated detection means according to different embodiments.

In one embodiment shown in FIG. 7B, the guard module 40 is operatively connected to proximity detection means 52 for detecting the mobile robot 20 as being within a predetermined distance 24 from the guard module 40. A predetermined distance 24 as considered throughout the description may be directly adjacently positioned or a distance of several meters, ranging anywhere between 0 and e.g. 10 meters. The predetermined distance 24 is by no means restricted to a certain distance, and may be customized depending on specific logistics arrangements 100. The predetermined distance may also vary over time in the same logistics arrangement 100, depending on what structures, robots, and objects are present within the logistics arrangement 100. The predetermined distance 24 is preferably determined by and included within the instructions executed by the control unit 50.

The predetermined distance 24 may also be related to an area that is located directly adjacent to the loading structure 10. The size and dimensions of the area may be decided by the configurations of the logistics arrangement 100. Such an area is entered by the mobile robot 20 when the predetermined distance 24 between the guard module 40 and the mobile robot 20 is sufficiently close. "Sufficiently close" in this regard may be decided upon what object is to be conveyed. For instance, if very small objects 30 are conveyed, the two areas 12, 22 need to be in direct contact with each other so that no objects are lost, and oppositely so for bigger objects 30. The area may correspond to any area at any height on or above floor or ground level being adjacent to the loading structure 10 or the guard module 40.

In another embodiment, also shown in FIG. 7B, the guard module 40 is operatively connected to conveying detection means 54 for detecting that one or more objects 30 have been successfully conveyed between the two storage areas 12, 22.

Both the proximity detection means 52 and the conveying detection means 54 may comprise a variety of different detectors based on different technologies. In some embodiments, optical sensors such as infrared data association (IrDA) or a QR-code (Quick Response) may be used for this purpose. For the proximity detection means 52, a code may be arranged on either one of the guard module 40, the mobile robot 20, or the loading structure 10, wherein, upon being within a predetermined distance 24 from one another, the other is configured to scan the code thereby effectively detecting its presence. The optical sensors herein are preferably arranged in conjunction with the guard module 40 and the top module 26 of the mobile robot 20. For the conveying detection means 54, the optical sensors are conveniently arranged on or near one or both of the storage areas 12, 22, thereby being able to detect when the objects 30 have been conveyed. Alternatively, the means 52, 54 may comprise weight or pressure sensors. For the proximity detection means 52, the weight or pressure sensors may be arranged so that they are able to identify when a mobile robot 20 is approaching or is within a predetermined distance 24 of the guard module by weighing it. Similarly, the conveying detection means 54 may be arranged on or near one or both of the storage areas 12, 22 for measuring weights of objects 30 that have been transported above the conveying detection means 54. In other alternatives, the means 52, 54 may comprise inductive sensors, magnetic sensors, photoelectric sensors, capacitive sensors, pneumatic sensors, motion sensors, cameras, electromechanical switches or any combination thereof to detect the mobile robot 20 as being within a predetermined distance 24 from the guard module and/or the objects 30 as being successfully conveyed between the two areas 12, 22. The proximity detection means 52 and the conveying detection means may comprise different sensor configurations. In a preferred embodiment of the invention, the proximity detection means 52 comprise optical sensors and the conveying detection means comprise ultrasonic sensors.

It is of particular importance that the different sensor technologies are not affected by background noises or similar inputs, incoming from e.g. other installations in logistics facilities, outdoor or indoor lights, sounds, and so forth. In one embodiment, the optical sensors may be based on modularized infrared emitting sensors that emit lights in specific pulse patterns. The receiving sensors may thus be configured to only process light in the specific pulse patterns, so that no disturbances are mistakenly being processed. In one embodiment, there are three user-selectable frequency channels for crosstalk avoidance in side by side sensor mounting. The different frequency channels changes the pulse coding in the infrared emitting sensors. Hence, immunity to High Frequency Fluorescent is provided. Moreover, false trips from other sensors is prevented. In order to block disturbing or otherwise unwanted signals, the logistics arrangement 100 may be provided with a signal blocker integrated with or external to any of its components. The signal blocker may for instance be a physical structure, provided as a cover or the like, and arranged in conjunction with the sensors to block certain signals.

In one embodiment, the control unit 50 is configured to operate the guard module 40 in response to having detected that the mobile robot 20 as within the predetermined distance 24 from the guard module 40. In other embodiments, logics internal to the guard module 40 is configured to control the operation of the guard module 40. As will be further described with reference to FIGS. 2-6, the guard module 40 may preferably be configured to be controlled in two modes: closed mode and open mode. In FIG. 1, the guard module 40 is shown in the open mode. In the closed mode, one or more objects 30 stored on the storage areas 12, 22 are being prevented to pass the guard module 40. Preventing objects 30 to pass the guard module 40 may be done by a physical barrier 42 (see e.g. FIG. 2A), which is adapted to be movable to an extended position 46 corresponding to the closed mode of the guard module 40. Using the same physical barrier 42, the open mode may correspond to the physical barrier 42 being moved to a retracted position 44 thereby allowing objects 30 to pass the guard module 40.

In one embodiment, the brakes of the conveying means 13, 23 are activated in the closed mode of the guard module 40. Oppositely so, the brakes of the conveying means 13, 23 are deactivated in the open mode of the guard module 40. If the conveying means 13, 23 are manually driven by the force from the objects being stored thereon 30, the guard module 40 may simply be used as a gate to stop and/or to allow objects to pass. Herein, brakes and/or motors controlling the first and/or second storage areas 12, 22 are not necessarily required.

The mobile robot 20 may also comprise a mobile robot controller 28, arranged within its top module 26. The mobile robot controller 28 may be based on similar technology as the control unit 50 as explained above. In one embodiment, the mobile robot controller 28 is configured to communicate its presence as being within the predetermined distance 24. This may be done by establishing direct communication with the guard module 40. Direct communication between the guard module 40 and the mobile robot 20 is established as a wide variety of communication techniques. In a preferred embodiment, direct communication is established using any IoT-service protocol (Internet of Things) sending proximity-based radio communication signals, including but not limited to Bluetooth, Wi-Fi, ZigBee, MQTT, CoAP, DDS, LoRaWAN, etc. Alternatively, a beacon protocol such as iBeacon, AltBeacon, URIBeacon or Eddystone may be used. Yet alternatively, NFC-based technologies (near field communication) such as RFID (radio-frequency identification) can be used, by i.e. providing a scannable tag for either one of the mobile robot 20 or the loading structure 10 to read upon the mobile robot 20 being within the predetermined distance 24. In other embodiments, the direct communication can be established by emitting (ultra)sound communication or by using infrared data communication.

Embodiments for controlling the guard module 40 between the closed and open mode will be thoroughly explained later with reference to FIGS. 4A-4B, 5A-5B and 6A-6B.

Following FIGS. 2A-E, an operating sequence of a logistics arrangement according to one embodiment is illustrated. The operating sequence shown is illustrating a procedure for loading an object 30 from a loading structure 10 onto the mobile robot 20. In this embodiment, the guard module 40 comprises the physical barrier 42, and the operating sequence shown in the figures will now be explained in detail. The illustrated embodiment serves as an example only, and the loading procedure is therefore, by no means, limited to the embodiment presented.

Figure 2A:
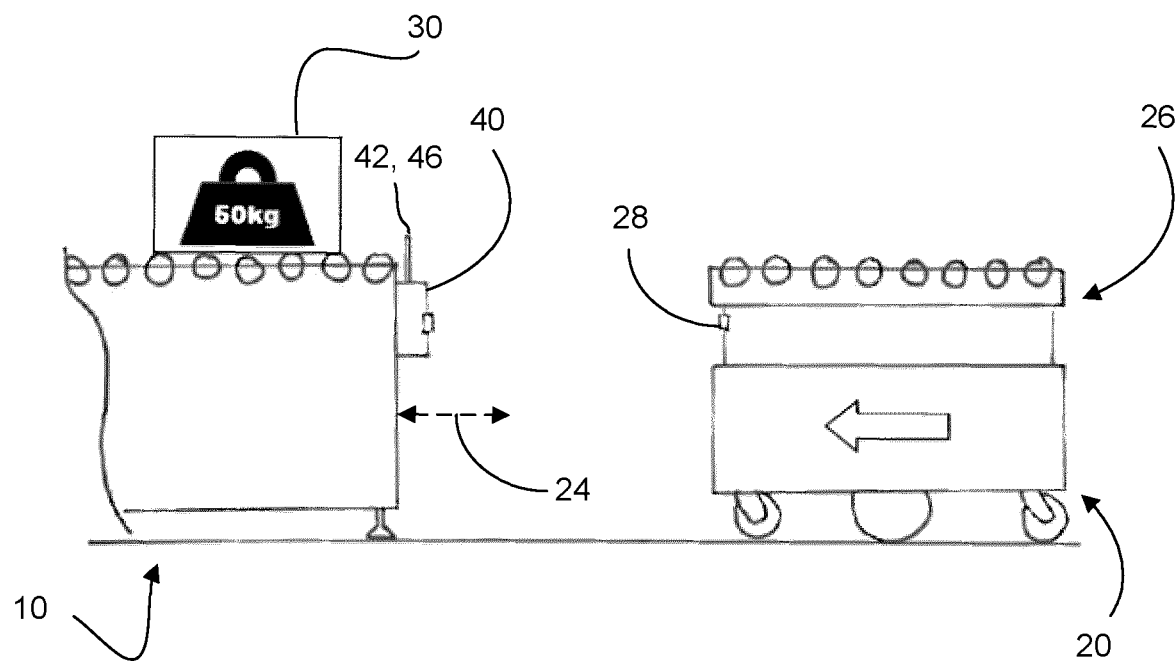
FIGS. 2A-E illustrate an operating sequence of a logistics arrangement according to an embodiment.

Starting from FIG. 2A, the mobile robot 20 is seen approaching the loading structure 10 from outside the predetermined distance 24 in the direction of the block arrow. In this stage, the guard module 40 is in the closed mode, thereby detaining the object 30 in the first storage area 12. Furthermore, the brakes of the conveying means 13 of the first storage area 12 are in this stage activated, thus restricting movement of the object 30 being stored thereon.

Figure 2B:
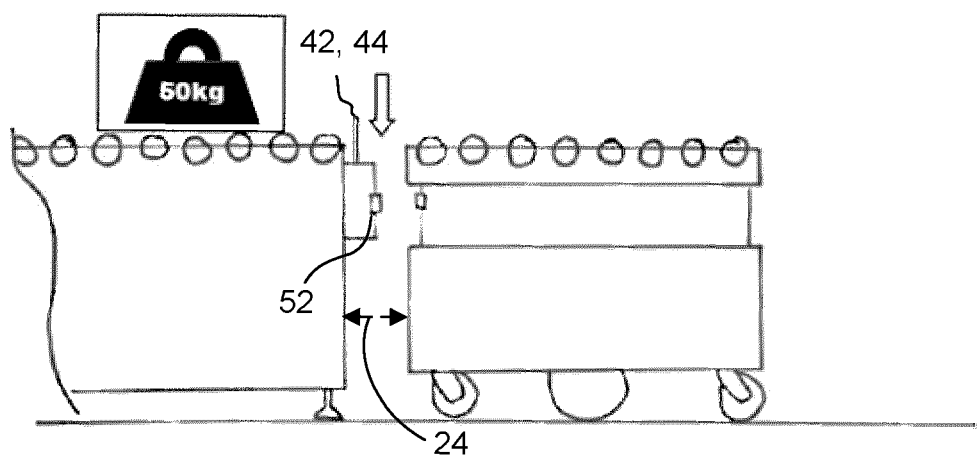

In FIG. 2B, the mobile robot 20 has approached the loading structure 10, and is now within the predetermined distance 24 from the guard module 40. In one embodiment, the proximity detection means 52 is configured to detect that the mobile robot 20 is within the predetermined distance 24. As a response, the guard module 40 is controlled to operate in the open mode, thereby moving the physical barrier 42 towards the retracted position 44 in the direction of the block arrow. In another embodiment, the mobile robot 20 is configured to communicate its presence as being within the predetermined distance 24. This may be done by the mobile robot controller 28 in the top module 26 of the mobile robot 20. The mobile robot controller 28 may comprise a communication interface for this purpose. In alternative embodiments, a master system is controlling the communication in a network-based communication system such as for instance WAN, WLAN or WPAN. Consequently, direct communication between the mobile robot 20 and the guard module 50 is established using any of the previously described communication techniques. When direct communication has been established, the mobile robot controller 28 is configured to transmit a control signal to the guard module 40, via the established communication, for controlling the guard module 40 to operate in an open mode. Hence, the physical barrier 42 moves towards the retracted position 44.

Figure 2C:
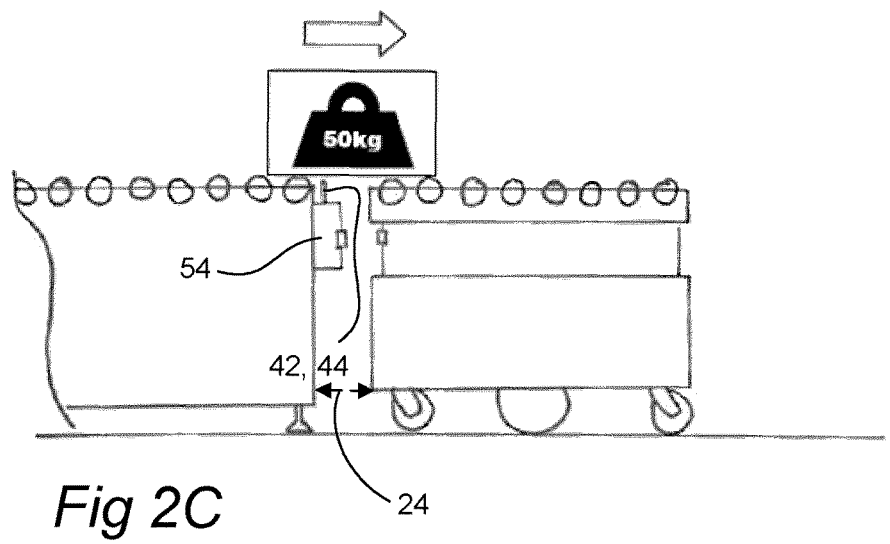

With reference to FIG. 2C, the physical barrier 42 has now been moved to the retracted position 44, thereby enabling the object 30 to pass the guard module 40 and be conveyed between the storage areas 12, 22. The conveying detection means 54 may communicate to either one or both of the mobile robot controller 28 and the guard module 40 that conveying of the object 30 is ready to begin. In one embodiment, the guard module 40 and/or the mobile robot 20 is thereby configured to transmit a control signal for deactivating the brakes of at least one of the conveying means 13, 23 of the first or second storage areas 12, 22. Consequently, the conveying means 13, 23 of the first and/or second storage areas 12, 22 are adapted to begin rotating around their axes, or an electric motor is configured to activate the conveying means 13, 23.

Figure 2D:
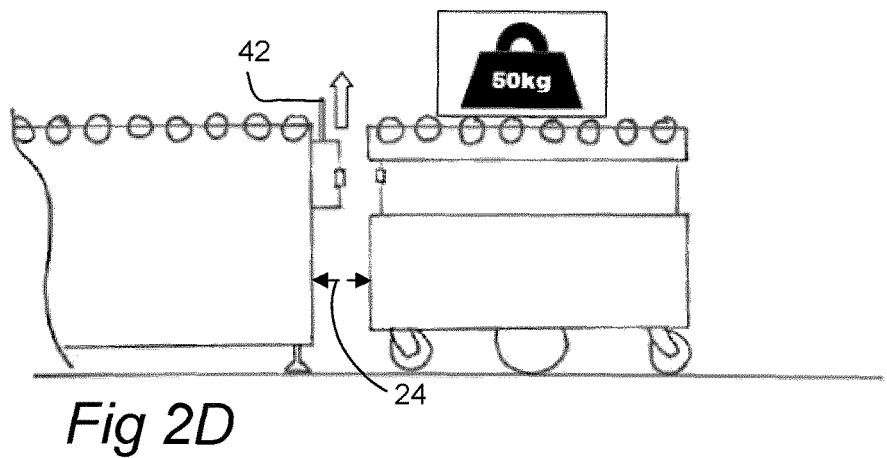

FIG. 2D illustrates that the object 30 has been successfully transferred between the first and second storage areas 12, 22. This may be communicated by the conveying detection means 54 to either one or both of the mobile robot controller 28 or the guard module 40. The interaction between the mobile robot 20 and the loading structure 10 is thereby finished. In response to the conveying detection means 54 having signaled that the object 30 has been successfully conveyed, the guard module 40 is controlled to operate in the closed mode, thereby moving the physical barrier 42 towards the extended position 46 in the direction of the block arrow. In one embodiment, moving the physical barrier 42 is controlled by the guard module 40. In another embodiment, the mobile robot 20 is, from its controller 28, configured to transmit a control signal to the guard module 40 to operate in the closed mode. In the closed mode, the guard module 40 and/or the mobile robot 20 may be configured to transmit a control signal for activating the brakes of the conveying means 13, 23 on at least one of the first and second storage areas 12, 22. In one embodiment, the mobile robot 20 may move out from the predetermined distance 24 before the physical barrier 42 has been fully extended to its extended position 46 only if the object 30 has been successfully conveyed. This may save some additional time as opposed to having to wait for the physical barrier 42 to fully extend to its extended position 46.

Figure 2E:
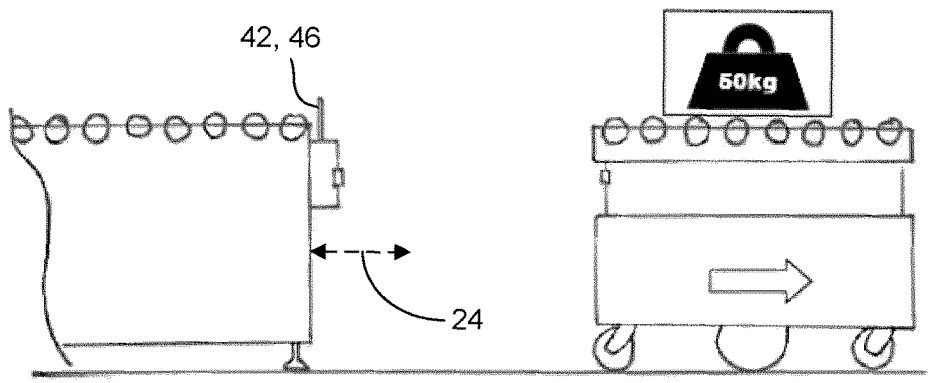

In FIG. 2E, the object 30 has been conveyed between the two storage areas 12, 22, the brakes of the conveying means 13, 23 are preferably activated, and the physical barrier 42 is preferably located in its extended position 46. Hence, the mobile robot 20 may for instance move to another loading structure 10 for unloading of the object 30 thereon.

It should be readily understood that the procedure of unloading an object 30 from the mobile robot 20 onto the loading structure 10 may be conducted in a similar fashion as the above described loading procedure with reference to FIGS. 2A-E, only oppositely.

FIGS. 3A-C illustrate a general embodiment of a guard module 40. The physical barrier 42, in the form of a planar and rectangular disc, is in FIG. 3A in its retracted position 44, or at least on its way downwards towards its retracted position 44, corresponding to an open mode of the guard module 40. In FIG. 3B, the physical barrier 42 is in its extended position 46, or at least on its way upwards towards its extended position 46, corresponding to a closed mode of the guard module 40. In the embodiment illustrated, the control unit 50 has been arranged on one side of the guard module 40. As can be seen in FIGS. 3A-C, the physical barrier 42 is moveable relative a housing 43 of the guard module 40. The housing 43 forms a fixed structure of the guard module 40, and the physical barrier 42 protrudes out from the housing 43, at least in its extended position 46. FIG. 3C shows a general view of the components, switches, actuators and sensors internal to the guard module 40 which are now explained in detail with reference to different embodiments of the guard module 40 in FIGS. 4A-4B, 5A-5B and 6A-6B.

Figure 4A:
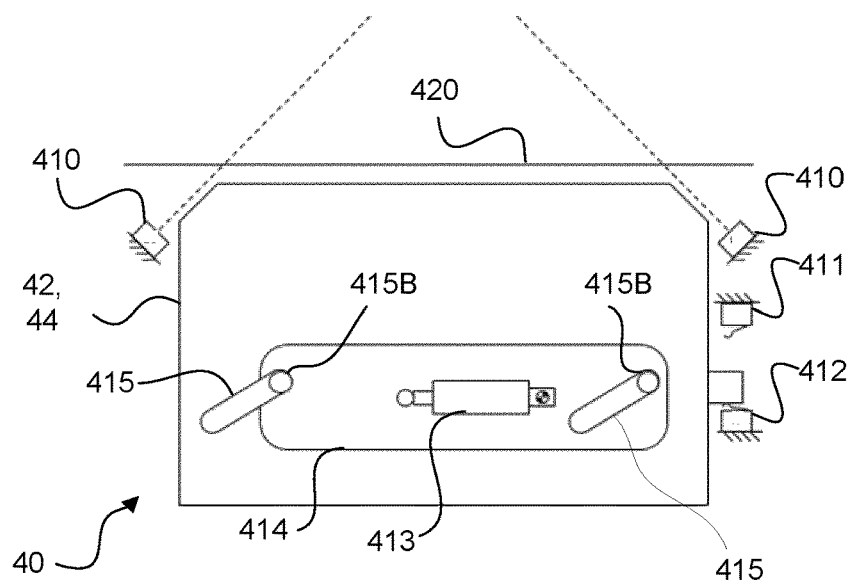
FIGS. 4A-4C show one embodiment of a guard module.
Figure 4B:
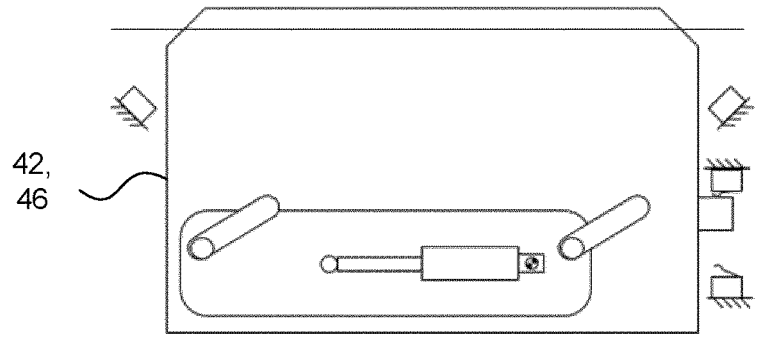
Figure 4C:
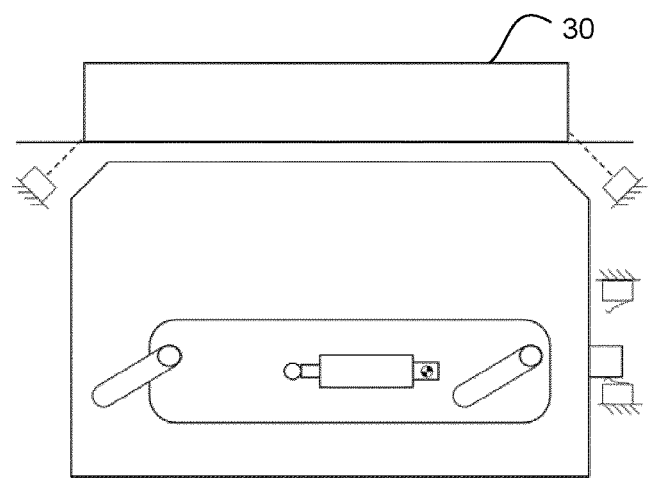

FIGS. 4A-C illustrate one embodiment of the guard module 40. Herein, the guard module 40 comprises two or more object transceivers 410 configured to detect whether an object 30 is located above the guard module 40. The object transceivers may be configured to detect one or more objects 30 being positioned at the guard surface 420. For instance, the object transceivers 410 may be based on similar technology as the proximity and/or conveying detection means 52, 54 described earlier. The object transceivers 410 can advantageously be positioned so that objects 30 with any size and/or dimensions can be detected. FIGS. 4A and 4C show different positions of the transceivers 410. The transceivers 410 may also be arranged above the guard surface 420 in a structure adjacent to the physical barrier 42. In one embodiment, the transceivers 410 are movable in relation to the guard module 40. If any object 30 has been detected as misplaced on the guard surface 420, the physical barrier 42 will not continue to move upwards. Alternatively, an additional switch can be placed on or just beneath the guard surface 420 for detecting a misplaced object 30. The guard module 40 further comprises a closing switch 411 configured to stop the movement of the physical barrier 42 when the extended position 46 corresponding to the closed mode of the guard module 40 has been reached. Further to this, the guard module 40 comprises an opening switch 412 configured to stop the movement of the physical barrier 42 when the retracted position 44 corresponding to the open mode of the guard module 40 has been reached. The guard module 40 also comprises a drive unit 414 which in turn comprises a motorized actuator 413. Upon activation, the actuator 413 will cause a linear movement of the drive unit 414 between the two positions shown in FIGS. 4A and 4B, respectively. The drive unit 414 is provided with two tilted guiding tracks 415, Each guiding track 415 is accommodating a guiding pin 415B of the physical barrier 42. Hence, as the drive unit 414 moves, the guiding pins 415B will be forced to follow the motion of the drive unit 414. However, as the physical barrier 42 (and hence its associated guiding pins 415B) are prevented to move sideways, the horizontal motion of the drive unit 414 will be translated to a vertical motion of the physical barrier 42. The physical barrier 42 will therefore move between the two end positions of the guiding tracks 415, as indicated in FIGS. 4A and 4B, corresponding to the retracted and the extended positions 44, 46. The position of the switches 411, 412 is preferably matched with the two end positions of the tracks 415, thereby preventing any further movement of the physical barrier 42 upon reaching one of the switches 411, 412. In an alternative embodiment, the switches 411, 412 are arranged directly on the drive unit 414 so that they can register the movement on the drive unit 414 instead of the tracks 415. Yet alternatively, the switches 411, 412 are built-in switches arranged inside directly inside the actuator 413.

If an object 30 has been successfully conveyed between two storages areas 12, 22, and the object transceivers 410 are not detecting any misplaced object 30 on the guard surface 420, the mobile robot 20 may be configured to move out from the predetermined distance 24 without the physical barrier 42 having yet fully extended to its extended position 46.

In FIG. 4A, the guard module 40 is in the open mode allowing objects 30 to pass the guard module 40. In the open mode, the tracks 415 have guided the physical barrier 42 to reach the opening switch 412 and the object transceivers 410 are monitoring the area just above the guard module 40 for any misplaced object 30. In FIG. 4B, the guard module 40 is in the closed mode preventing objects 30 to pass the guard module 40. In the closed mode, the tracks 415 have guided the physical barrier 42 to reach the closing switch 411 and the object transceivers 410 are no longer monitoring the area just above the guard module 40 for any object 30. In FIG. 4C, a misplaced object 30 has been detected by the object transceivers 410, thus preventing any further movement of the physical barrier 42 until any action has been taken.

In the embodiments presented related to FIGS. 4A-C, multiple advantages can be provided. For instance, action can be taken if an object 30 is misplaced on the guard surface 420. Such action may include automatically rolling back the object 30 by the conveying means 13, 23, emitting an audible alarm signal, sending a control signal to a master control system, stopping the action of the mobile robot 20, loading structure 10 and/or the guard module 40, or activating an external flap to remove the misplaced object 30 into a container in conjunction with the loading structure 10. Other advantages that can be provided is that very light objects can be detected due to the position of the object transceivers 410. Hence, there is a minimal risk of lifting, misplacing or tilting the very light objects. Additionally, the provided components ensure minimal wear of the mechanical parts of the guard module 40. However, the power consumption of the actuator is preferably monitored in order to stop the actuator and trigger some of the above mentioned actions. Hence, a manual reset of the guard module 40 may be required to return to normal functionality after an object 30 has been detected on the guard surface 420.

Figure 5A:
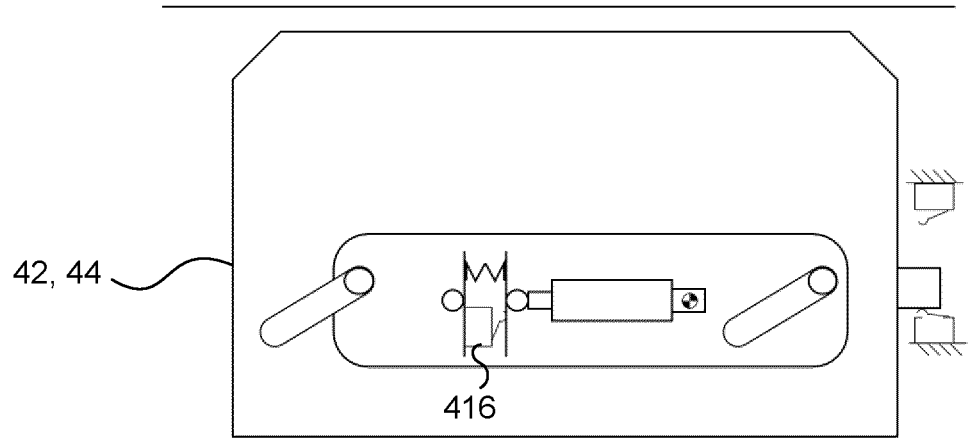
FIGS. 5A-5D show one embodiment of a guard module.
Figure 5B:
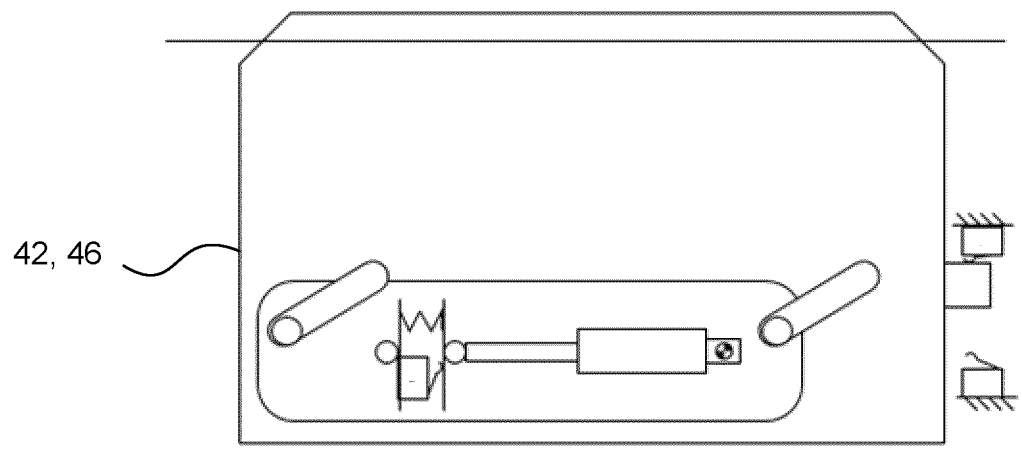
Figure 5C:
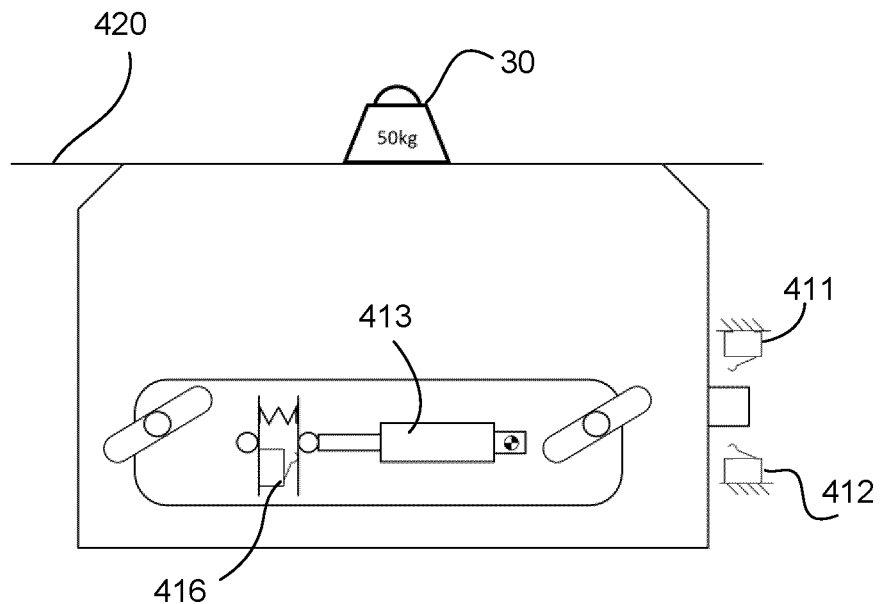

FIGS. 5A (open mode), 5B (closed mode) and 5C-D show another embodiment of the guard module 40. The components provided in the guard module 40 are similar to those of the components presented in relation to FIGS. 4A-D. However, the embodiment illustrates a preferred approach for detecting misplaced objects 30 on the guard surface 420. FIG. 5C shows a scenario wherein a misplaced object 30 is detected. No object transceivers 410 are used, but instead a blocking switch 416 is coupled with the actuator 413. The blocking switch 416 is spring-biased, so that the switch 416 will close when there is a load present requiring an increased force to lift the physical barrier 42. If a misplaced object 30 is detected on the guard surface 420, the blocking switch 416 is activated during the closing or opening process of the guard module 40. Consequently, movement of the physical barrier 42 will be blocked in between the opening and closing switches 411, 412, thereby preventing further movement until action has been taken to remove the misplaced object 30. The blocking switch 416 may also be built-in with the actuator 413.

Figure 5D:
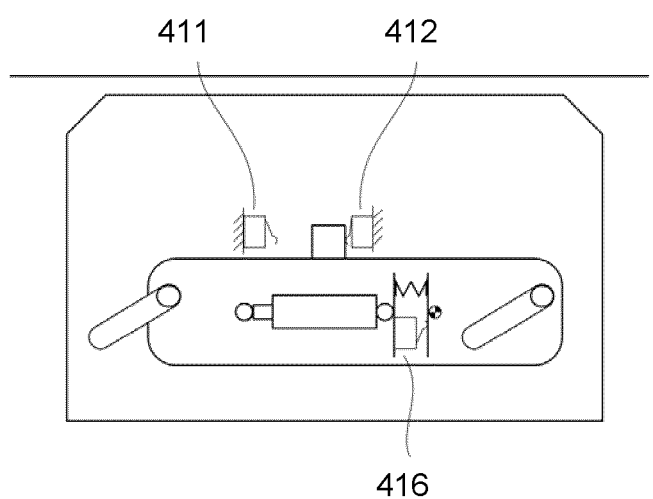

FIG. 5D illustrates a preferred embodiment of the guard module 40. The opening and closing switches have been arranged on the activator 414. This is particularly advantageous for a number of reasons. Similarly to the embodiment described with reference to FIGS. 4A-C, action can be taken if a misplaced object 30 is detected. However, not requiring object transceivers 410 is beneficial for both cost and power consumption monitoring. Therefore, the guard module 40 may simply return to normal functionality once the misplaced object is removed 30 since no power consumption monitoring of the actuator as mentioned above may be needed.

Figure 6A:
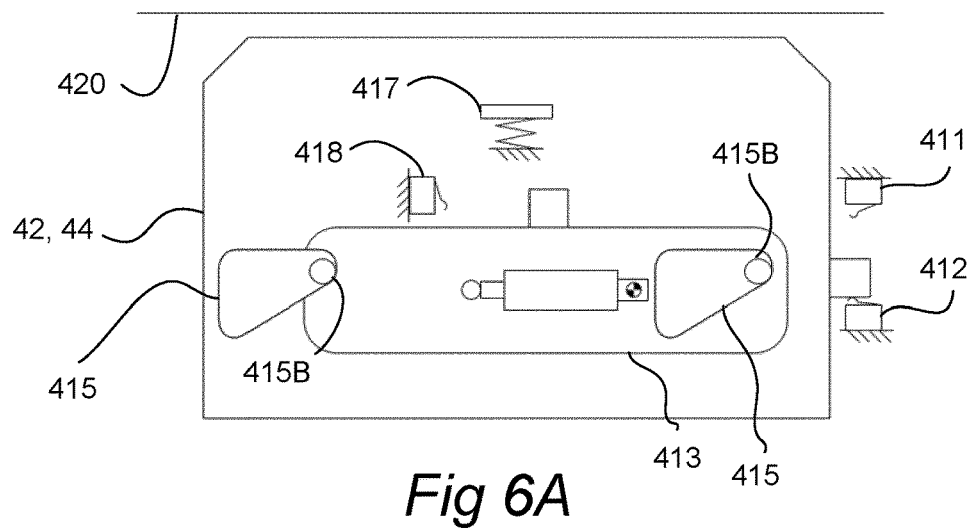
FIGS. 6A-6C show one embodiment of a guard module.
Figure 6B:
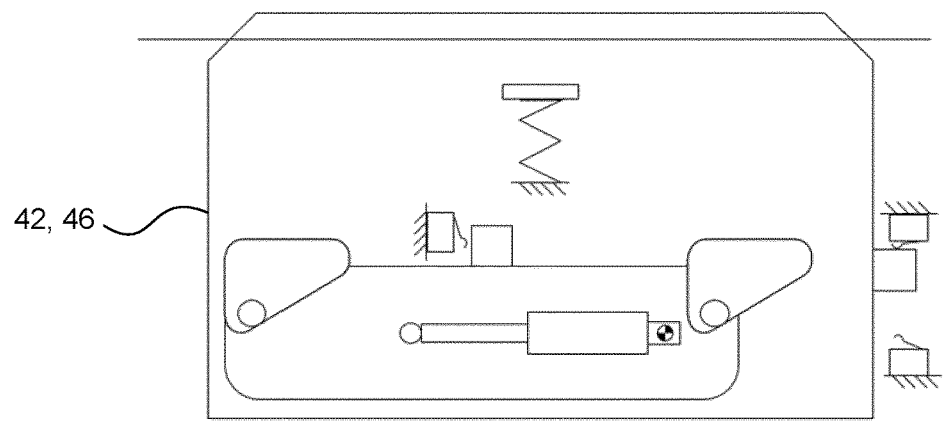
Figure 6C:
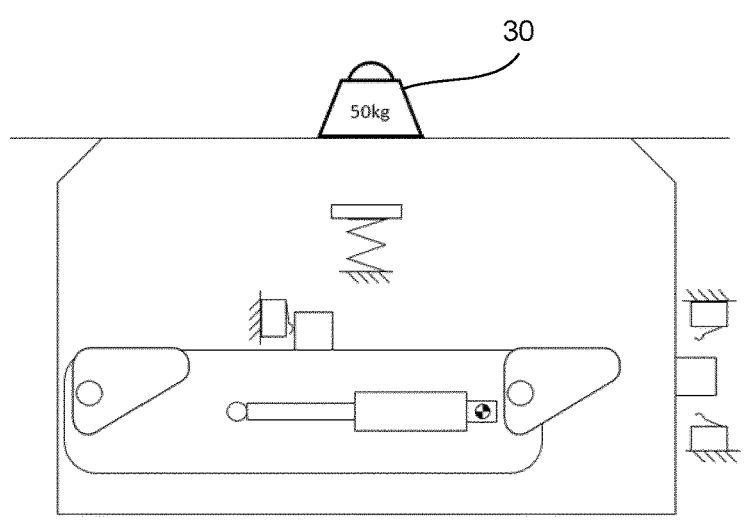

In the embodiment shown in FIGS. 6A (open mode), 6B (closed mode) and 6C, a spring 417 is arranged on the physical barrier 42 for controlling the movement of the physical barrier 42. Hence, the tracks 415 may not be required to define the upwards motion of the physical barrier 42, but only the downward motion. Shown in FIG. 6A-C is also an additional switch 418 which is triggered if a misplaced object 30 is detected on the guard surface 420. Similarly to FIG. 5A-D, movement of the physical barrier may then be stopped in between the opening and closing switches 411, 412, as shown in FIG. 6C. The additional switch 418 is configured to close (i.e. detect the misplaced object 30) in the following manner. While the opening and closing switches 411, 412 define the end positions of the physical barrier 42, especially the closing switch 412 is arranged not fully at the end position of the track 415. Hence, it is physically possible for the drive unit 413 to move past the positon of the closing switch 412. If a misplaced object 30 is present, the physical barrier 42 will not reach its vertical end position defined by the closing switch 412, but the drive unit 413 will still be allowed to move horizontally until the guide pin 415B of the physical barrier 42 reaches the horizontal end position of the guiding track 415. At this position, the additional switch 418 will close thereby indicating the presence of the misplaced object 30. The embodiment shown in FIGS. 6A-C is advantageous in that it does not require any additional electronic sensors or switches to detect misplaced objects other than the additional switch 418. Furthermore, similar advantages can be provided for the same reasons as the embodiment shown in FIGS. 5A-D by not having any object transceivers 410.

With reference to FIG. 7A, a schematic block diagram of operations performed by a guard module 40 is shown, according to one embodiment. Following the flowchart, the guard module 40 is configured to identify which mode its currently in. If it's in the closed mode, the guard module 40 is configured to wait until the proximity detection means 52 have detected a mobile robot 20 as being within the predetermined distance 24, and/or until a mobile robot 20 has communicated its presence via an established direct communication to the guard module 40. Subsequently, the guard module 40 is configured to be operated in the open mode allowing objects 30 to pass the guard module 40 between the storage areas 12, 22. If the guard module 40 is in the open mode, the guard module 40 is configured to wait until the conveying detection means 54 have detected that objects 30 have been successfully conveyed between the storage areas 12, 22 and/or until the mobile robot 20 has transmitted a control signal. Subsequently, the guard module 40 is configured to operate in the closed mode preventing objects 30 to pass the guard module 40.

Figure 8:
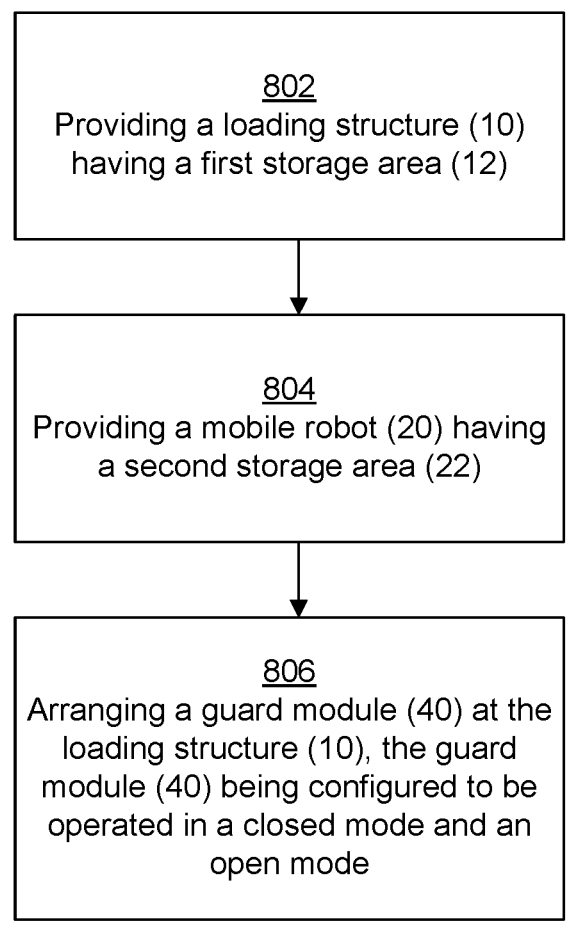
FIG. 8 is a schematic block diagram of a method for conveying objects in a logistics arrangement.

FIG. 8 illustrates a schematic block diagram of a method 800 for conveying objects 30 between two or more storage areas 12, 22 in a logistics arrangement 100. The method 800 involves a first step of providing 802 a loading structure 10 having a first storage area 12. Secondly, the method 800 involves a step of providing 804 a mobile robot 20 having a second storage area 22. The method 800 also involves a step of arranging 806 a guard module 40 between the loading structure 10 and the mobile robot 20, wherein the guard module 40 is configured to be operated in a closed mode and an open mode.

In one embodiment, the loading structure 10 and/or the mobile robot 20 may be provided as autonomous vehicles operating autonomously based on self-learning systems. For instance, data may be inputted to the system from a camera, and the data may be processed to improve the loading, conveying and unloading procedures. Hence, efficiency and safety can be enhanced autonomously during operation. Similarly, such a system may intelligently generate e.g.

machine health attributes for reporting when e.g. mechanical components needs to be replaced.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A logistics arrangement for conveying objects between different locations in a logistics facility, wherein the logistics arrangement comprises:
   a loading structure having a first storage area;
   a mobile robot having a second storage area configured to receive the objects from the loading structure and deliver the objects at at least one of the different locations, the mobile robot being an automated guided vehicle configured or programmed to move within the logistics facility;
   a guard module arranged at the loading structure, the guard module being configured to be operated in a closed mode and an open mode
   a proximity sensor configured to generate a proximity signal indicative that the mobile robot is within a predetermined distance from the guard module before the mobile robot contacts the guard module, and
   a controller programmed to receive the proximity signal and in response thereto cause the guard module to operate in the open mode to allow at least one of the objects to move from the loading structure to the mobile robot.

2. The logistics arrangement according to claim 1, wherein in the closed mode, one or more objects are prevented from passing the guard module, and wherein in the open mode, one or more objects are allowed to pass the guard module to allow the one or more objects to be transferred from the first storage area to the second storage area.

3. The logistics arrangement according to claim 2, wherein the guard module comprises a physical barrier adapted to be movable between an extended position corresponding to the closed mode of the guard module and a retracted position corresponding to the open mode of the guard module.

4. The logistics arrangement according to claim 1, wherein the controller is programmed to operate the guard module in the closed mode and the open mode.

5. The logistics arrangement according to claim 4, wherein the controller is arranged at the loading structure, at the mobile robot, or at the guard module.

6. The logistics arrangement according to claim 1, wherein the guard module is operatively connected to the proximity sensor.

7. The logistics arrangement according to claim 6, wherein the proximity sensor comprises:
   optical sensors;
   ultrasonic sensors;
   inductive sensors;
   magnetic sensors;
   photoelectric sensors;
   capacitive sensors;
   pneumatic sensors;
   weight or pressure sensors;
   motion sensors;
   cameras;
   electromechanical switches; or
   any combination thereof.

8. The logistics arrangement according to claim 1, wherein the guard module is operatively connected to a conveyor detector configured to generate a conveyor signal that one or more objects have been successfully conveyed between the first and second storage areas, and wherein the controller is programmed to operate the guard module in the closed mode in response to receipt of the conveyor signal.

9. The logistics arrangement according to claim 8, wherein the conveyor detector comprises:
   optical sensors;
   ultrasonic sensors;
   inductive sensors;
   magnetic sensors;
   photoelectric sensors;
   capacitive sensors;
   pneumatic sensors;
   weight or pressure sensors;
   motion sensors;
   cameras;
   electromechanical switches; or
   any combination thereof.

10. The logistics arrangement according to claim 1, wherein the controller is programmed to receive the proximity signal that the mobile robot is located at a predetermined distance from the guard module by establishing direct communication with the guard module, and the controller is configured to transmit a control signal to the guard module, via the established direct communication, to cause the guard module to operate in an open mode.

11. The logistics arrangement according to claim 10, wherein the mobile robot is programmed to transmit a control signal, via the established direct communication, that one or more objects have been successfully conveyed between the first and second storage areas, thereby controlling the guard module to operate in the closed mode.

12. The logistics arrangement according to claim 10, wherein direct communication between the guard module and the mobile robot is established as any of the following communication techniques:
   a proximity-based radio communication signal;
   a beacon protocol;
   NFC;
   (ultra) sound communication; and
   infrared data communication.

13. The logistics arrangement according to claim 1, wherein the first and/or second storage area comprises a conveyor having brakes, wherein the controller is programmed to:
   in the closed mode, cause the guard module and/or the mobile robot to transmit a control signal for activating the brakes of the conveyor, and
   in the open mode, cause the guard module and/or the mobile robot to transmit a control signal for deactivating the brakes of the conveyor.

14. The logistics arrangement according to claim 1, wherein the guard module is arranged on at least one transport end of the loading structure.

15. The logistics arrangement according to claim 1, wherein the loading structure is a fixed structure or another mobile robot.

16. The logistics arrangement according to claim 1, wherein the mobile robot comprises a top module, the top module comprising:
   a mobile robot controller, wherein the mobile robot controller is programmed to communicate its presence as being within a predetermined distance from the guard module by establishing direct communication with the guard module.

* * * * *